United States Patent
Kihara (10) Patent No.: US 7,362,482 B2
(45) Date of Patent: Apr. 22, 2008

(54) INLINE TYPE SPECKLE MULTIPLEXED HOLOGRAM RECORDING APPARATUS AND INLINE TYPE SPECKLE MULTIPLEXED HOLOGRAM RECORDING METHOD

(75) Inventor: Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 293 days.

(21) Appl. No.: 11/095,596

(22) Filed: Apr. 1, 2005

(65) Prior Publication Data

US 2005/0243389 A1    Nov. 3, 2005

(30) Foreign Application Priority Data

Apr. 5, 2004 (JP) ............... 2004-110877

(51) Int. Cl.
G03H 1/12 (2006.01)
G03H 1/28 (2006.01)

(52) U.S. Cl. ......................... 359/11; 359/24

(58) Field of Classification Search ............ 359/10, 359/11, 21, 22, 24, 25, 28
See application file for complete search history.

(56) References Cited

U.S. PATENT DOCUMENTS 6,108,110 A * 8/2000 Orlov et al. ............... 359/22
7,088,481 B2 * 8/2006 Edwards ..................... 359/11
7,088,482 B2 * 8/2006 Edwards ..................... 359/11

FOREIGN PATENT DOCUMENTS

DE    22 45 670 C1    3/1994
EP    0 450 644 A2    10/1991
EP    1 306 732 A1    5/2003

OTHER PUBLICATIONS

Sergei S. Orlov, "Volume Holographic Data Storage", Communications of the ACM, XP-002400354, vol. 43, No. 11, Nov. 2000, pp. 46-54.

* cited by examiner

*Primary Examiner*—Alessandro Amari
(74) *Attorney, Agent, or Firm*—Oblon, Spivak, McClelland, Maier & Neustadt, P.C.

(57) ABSTRACT

An inline type speckle multiplexed hologram recording apparatus and method is disclosed which can condense signal light and reference light in a sufficiently overlapping relationship with each other on a hologram recording medium without using a lens having a large aperture and a wide angle of view. A signal light region and a reference light region are displayed on a spatial light modulator, and laser light is intensity modulated with recording data displayed in the signal light region to produce signal light while the laser light having passed through the reference light region is used as reference light. The signal light and the reference light are diffused by a diffuser and then condensed in an overlapping relationship with each other on a hologram recording medium by a lens such that interference fringes produced thereby are recorded in the hologram recording medium.

13 Claims, 8 Drawing Sheets

FIG. 12

INLINE TYPE SPECKLE MULTIPLEXED HOLOGRAM RECORDING APPARATUS AND INLINE TYPE SPECKLE MULTIPLEXED HOLOGRAM RECORDING METHOD

CROSS REFERENCE TO RELATED APPLICATION

The present invention contains subject matter related to Japanese Patent Application JP 2004-110877 filed in the Japanese Patent Office on Apr. 5, 2004, the entire contents of which being incorporated herein by reference.

BACKGROUND OF THE INVENTION

This invention relates to a speckle multiplexed hologram recording apparatus and method of the inline type, and more particularly to an inline type speckle multiplexed hologram recording apparatus and method which condenses signal light and reference light on a hologram recording medium without increasing the aperture of a lens.

In recent years, a hologram recording and reproduction system for recording and reproducing a large mount of data utilizing a hologram technique has been proposed. The hologram recording and reproduction system includes a recording system for illuminating signal light including recording data produced by a spatial light modulation section such as, for example, a liquid crystal device and reference light set corresponding to the signal light upon a hologram recording medium (recording member) at predetermined angles to record interference fringes produced by the signal light and reference light in the hologram recording medium. The hologram recording and reproduction system further includes a reproduction system for illuminating reproduction illumination light on the hologram recording medium to produce diffraction light corresponding to the interference fringes recorded in the hologram recording medium and receiving and analyzing the diffraction light by means of a light receiving device such as a CCD image sensor to reproduce the recorded data. It is to be noted that holograms for recording data recorded by illumination of light once is called page.

Further, in the hologram recording and reproduction system, a method called multiplexing recording is used in order to achieve a high recording density. Different from a recording method for a conventional optical disk, the multiplexing recording method records a great number of pages independent of each other at one place. As representative ones of such multiplexing recording methods as just described, an angle multiplexing recording method, a shift multiplexing recording method, a phase code multiplexing recording method and so forth are publicly known, and many other multiplexing recording methods are known. One of such multiplexing recording methods which is called speckle multiplexing (or correlation multiplexing) relates to the present invention and hereinafter described in detail.

Figure 9:
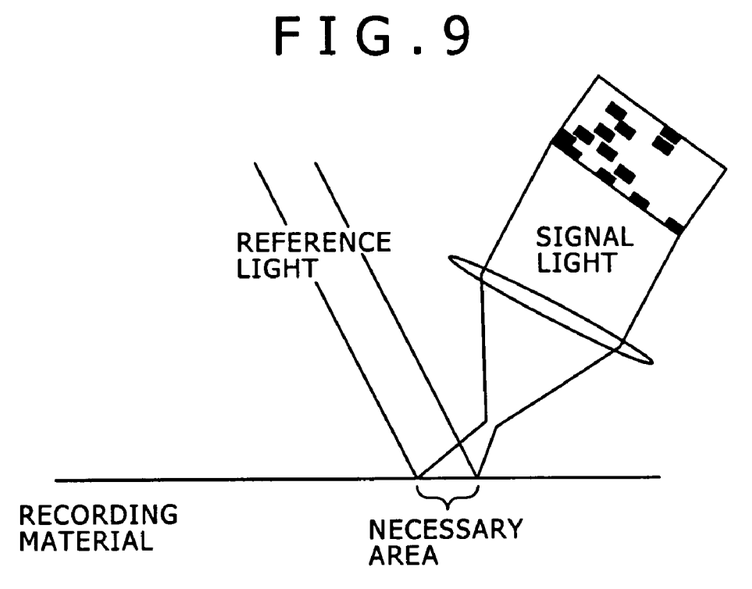
FIG. 9 is a schematic view illustrating an area necessary for recording by interference between signal light and reference light.
Figure 10:
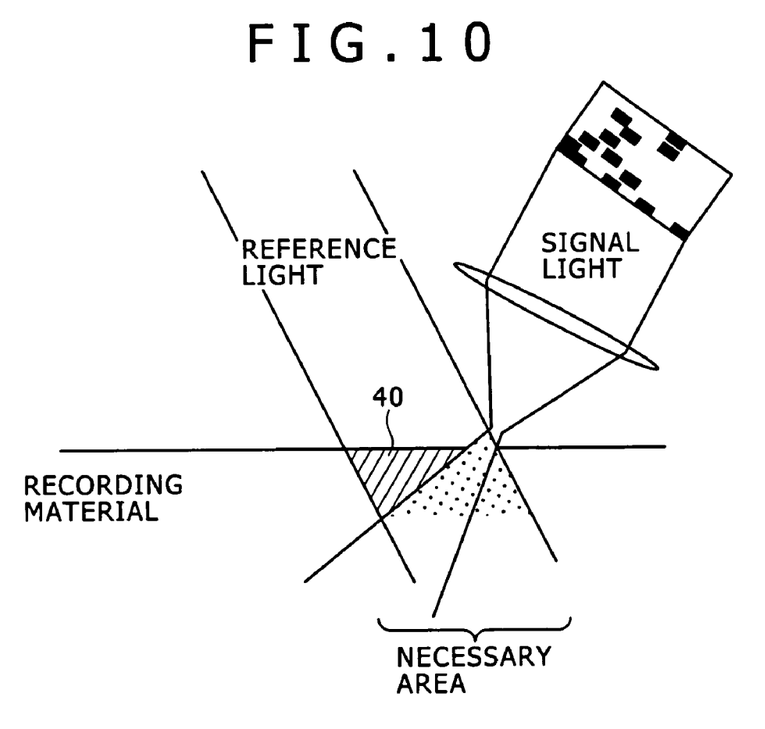
FIG. 10 is a schematic view showing an unavailable region produced upon recording by interference between signal light and reference light.

Incidentally, where a hologram is recorded in a recording member, there is a problem that an unavailable region arises from the thickness of the hologram. For example, if the thickness is ignored, then the area necessary for recording one page is such a range as shown in FIG. 9. However, since the recording member actually has a thickness, where such an overlap of signal light and reference light in the recording member as shown in FIG. 10 is taken into consideration, the area necessary for recording one page is considerably great when compared with that where the thickness is not taken into consideration. Besides, an unavailable region 40 appears, and this decreases the recording density and the dynamic range of a signal which can be recorded in the recording member.

One of possible countermeasures for solving the problem of the unavailable region is to minimize the angle defined by the signal light and reference light. However, if the angle defined by the signal light and reference light is small, then a phenomenon appears that the Bragg selectivity decreases to decrease the recording density conversely.

Figure 11:
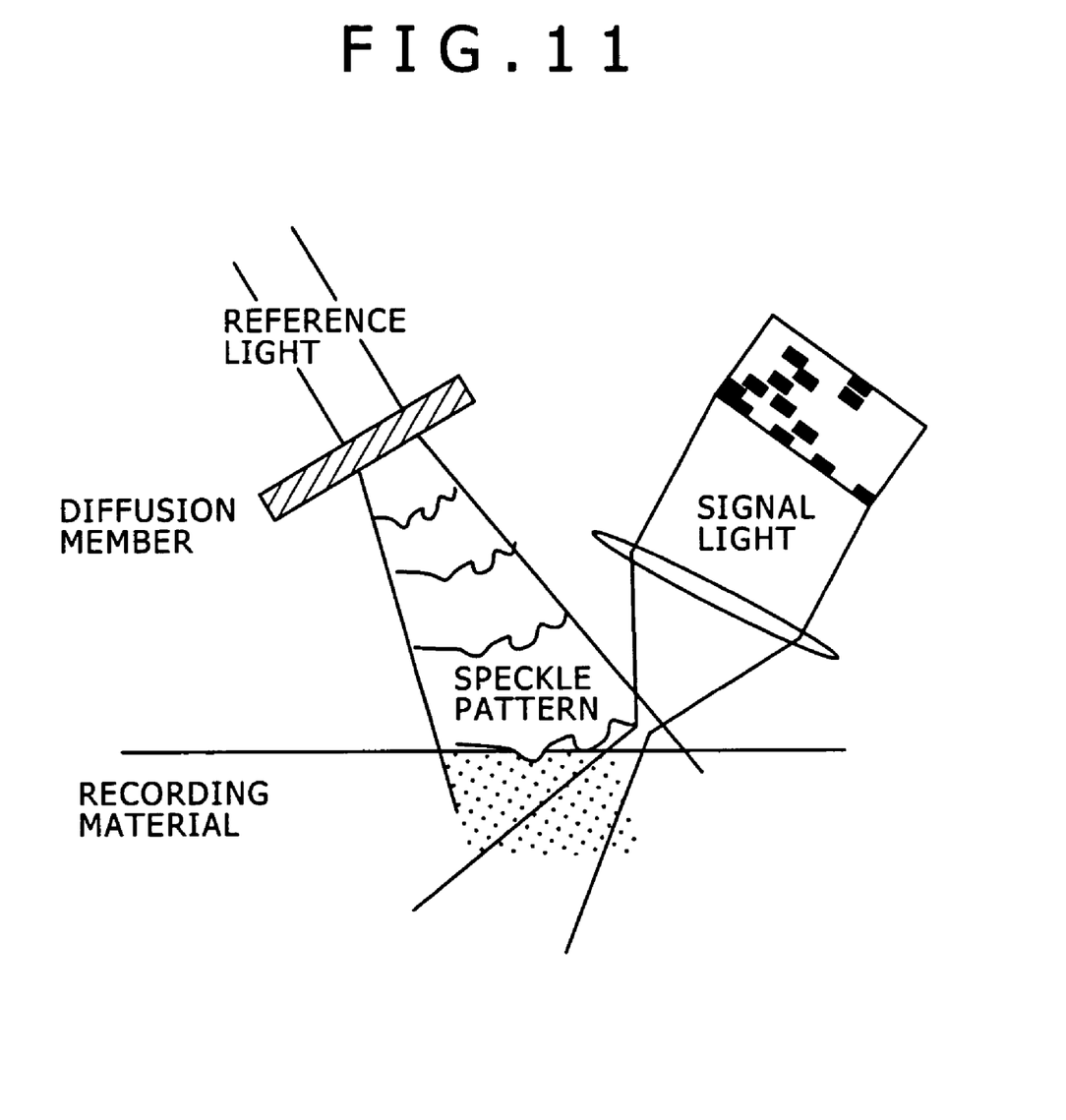
FIG. 11 is a schematic view illustrating a hologram recording operation of the speckle multiplexing method.

The speckle multiplexing method mentioned hereinabove is effective as a multiplexing method which enhances the recording density which decreases if the angle defined by the signal light and reference light is reduced. As seen in FIG. 11, according to the speckle multiplexing method, a diffusion member is placed in an optical path of the reference light so that the reference light diffused by the diffusion member and the signal light interfere with each other in the recording member.

Generally, the reference light diffused at random gives rise to random interference and consequently obtains a random intensity distribution called speckle pattern. In particular, according to the speckle multiplexing method, a speckle pattern and signal light interfere with each other. A hologram recorded in such a manner as just described has a characteristic that, if it is displaced by a distance equal to the speckle size, then an image is not reproduced. This is because, while, in the shift multiplexing which uses normal spherical wave reference light, a distance which depends upon the Bragg selectivity is required as the shift amount, in the speckle multiplexing, the distance corresponding to the speckle size is equal to the shift amount. Where the characteristic just described is taken into consideration, it can be recognized that the speckle multiplexing method is free from the problem that the Bragg selectivity decreases to decrease the recording density even if the angle defined by the signal light and reference light is reduced in order to decrease the unavailable region.

In other words, according to the speckle multiplexing, the signal light is not reproduced when the correlation function of the reference lights used upon recording and upon reproduction is zero. This signifies that, if the reference lights used are so different from each other that the correlation function is zero, then multiplexing recording can be implemented. If this is utilized, then also a speckle multiplexing method seems available which does not depend upon such a movement of a recording member as described. For example, also it is possible for the diffusion member shown in FIG. 11 to move to sufficiently vary the speckle pattern on the recording member to achieve multiplexing recording.

As can be recognized from the foregoing, where the thickness of the recording member is taken into consideration, in order to decrease the unavailable region, it is significant to reduce the angle defined by the signal light and reference light, and the speckle multiplexing method is effective as a method for preventing decrease of the recording density arising from decrease of the Bragg selectivity in this instance. Also a system which adopts such a viewpoint as just described is available. For example, as a system of the type just mentioned, an inline type hologram recording apparatus is disclosed in H. J. Coufal, D. Psaltis and G. T. Sincerbox, "Holographic Data Storage", ED; Springer; p. 396, Digital Holographic Demonstration System. A configuration of the inline type hologram recording apparatus is shown in FIG. 12.

Figure 12:
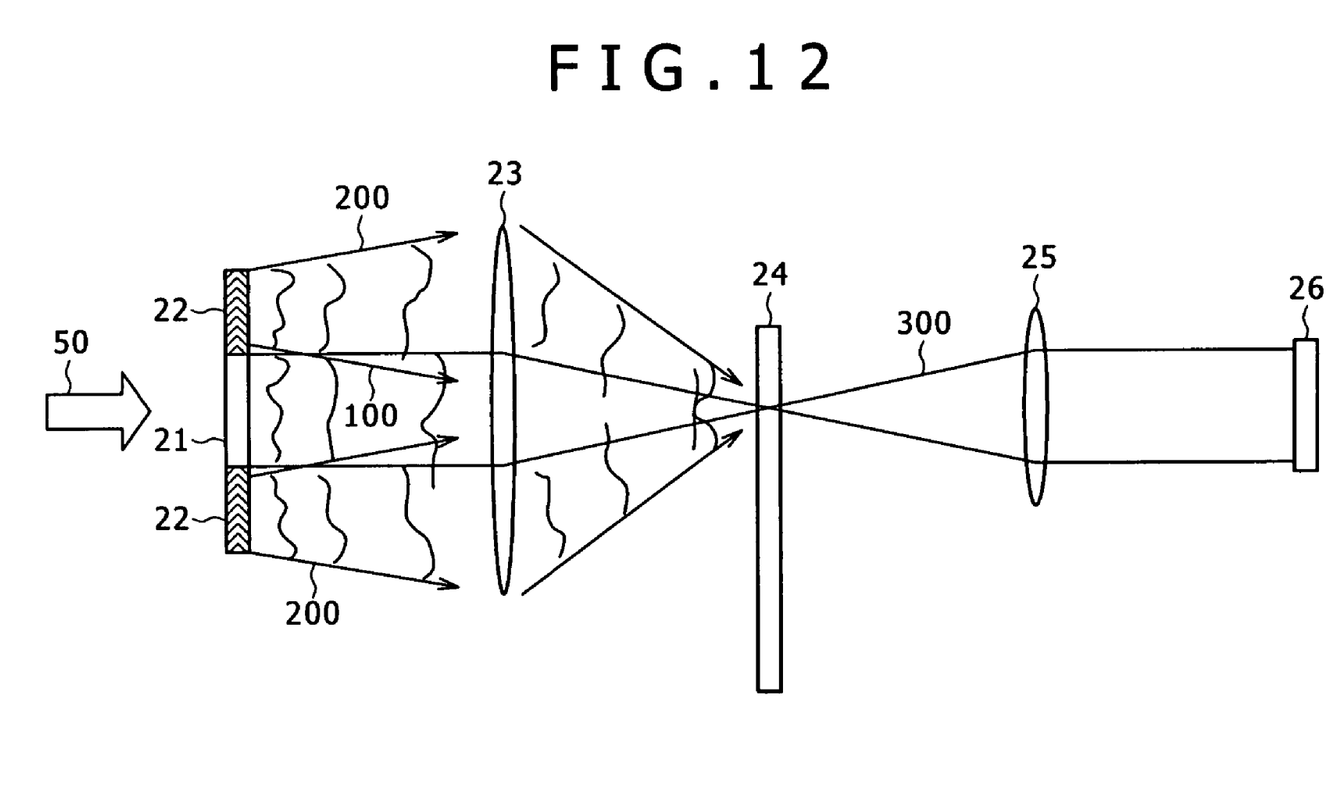
FIG. 12 is a schematic view showing an example of a configuration of a conventional inline type hologram recording and reproducing apparatus.

Referring to FIG. 12, the inline type hologram recording apparatus includes a spatial light modulator (SLM) 21 for intensity modulating laser light 50, and a diffuser 22 disposed around the spatial light modulator 21 for diffusing the laser light 50 at random. The inline type hologram recording apparatus further includes a lens 23 for condensing signal light 100 and reference light 200 on a hologram recording medium 24 so that a hologram is recorded in the hologram recording medium 24. The inline type hologram recording apparatus further includes another lens 25 for condensing diffraction light produced from the hologram recording medium 24 to form an image on an image sensor 26. The image sensor 26 performs a photoelectric conversion process for the image formed thereon to produce a reproduction signal.

Upon recording, the laser light 50 is introduced as parallel light into the spatial light modulator 21 and the diffuser 22. The laser light 50 introduced in the spatial light modulator 21 is converted into signal light 100 whose intensity is modulated with display data. On the other hand, the laser light 50 introduced in the diffuser 22 is diffused at random by the diffuser 22 to form reference light 200 having a speckle pattern. The signal light 100 and the reference light 200 are condensed on the hologram recording medium 24 by the lens 23. In this instance, interference fringes of the signal light 100 and the reference light 200 are recorded in the hologram recording medium 24. On the other hand, upon reproduction, if illumination reference light same as the reference light 200 used upon recording is illuminated on the hologram recording medium 24, then diffraction light corresponding to the recorded interference fringes is produced. Then, the diffraction light is condensed on the image sensor 26 by the lens 25 to form an image and photoelectrically converted by the image sensor 26. Thereafter, the resulting photoelectric conversion signal is processed to reproduce data.

SUMMARY OF THE INVENTION

Where the conventional inline type hologram recording apparatus described above is used, even if the angle defined by the signal light 100 and the reference light 200 is small, the problem can be avoided that the Bragg selectivity decreases to decrease the recording density. To this end, however, the angle of view of the lens 23 must be set wide. Originally, it is necessary for the lens 23 to have only an aperture through which the signal light 100 can pass. However, since such an arrangement as shown in FIG. 11 is applied, an aperture through which also the reference light 200 from the diffuser 22 can pass must be formed, and as a result, the angle of view of the lens 23 must be set wide. Since the lenses 23 and 25 have a roll of forming an image on the spatial light modulator 21 and image sensor 26, they are designed so as to cope with distortion and so forth in accordance with considerable strict requirements. Therefore, if the angle of view of the lens 23 increases, then significant difficulty occurs from the viewpoint of the design of the lens.

It is an object of the present invention to provide an inline type speckle multiplexed hologram recording apparatus and method which can condense signal light and reference light in a sufficiently overlapping relationship on a hologram recording medium without using a lens having a large aperture and a wide angle of view.

In order to attain the object described above, according to the present invention, the following measures are taken. In particular, in order to condense signal light and reference light on a hologram recording medium such that they sufficiently overlap with each other without using a lens which has a large angle of view and a great aperture, a signal light region and a reference light region are displayed on a spatial light modulator. Then, coherent light (laser light) is intensity modulated with recording data displayed in the signal light region to produce signal light while the light having passed through the reference light region is used as reference light. Then, the signal light and the reference light are diffused by a diffusion member. Thereafter, the diffused signal light and reference light are condensed on the hologram recording medium by a lens such that they overlap with each other to produce interference fringes. The thus produced interference fringes are recorded in the hologram recording medium.

More particularly, according to an embodiment of the present invention, there is provided an inline type speckle multiplexed hologram recording apparatus which produces signal light and reference light from coherent light and illuminates the signal light and the reference light from the same direction on a hologram recording medium to record interference fringes of the signal light and the reference light in the hologram recording medium, comprising a spatial light modulator for spatially modulating the coherent light, and a display control section for displaying a reference light region to be used to produce the reference light from the coherent light introduced into the spatial light modulator and a signal light region to be used to produce the signal light intensity modulated with data at the same time on the spatial light modulator.

In the inline type speckle multiplexed hologram recording apparatus, a signal light region and a reference light region are displayed on the spatial light modulator, and coherent light (laser light) is intensity modulated with recording data displayed in the signal light region to produce signal light while the light having passed through the reference light region is used as reference light. Then, the signal light and the reference light are diffused by the diffusion member and condensed on the hologram recording medium by the lens. Consequently, it is only necessary for the lens to have an aperture approximately equal to the size of the spatial light modulator, and the signal light and the reference light can be condensed on the hologram recording medium without using a lens which has a great aperture and a great angle of view. Besides, if the reference light region is disposed inside the signal light region, then the signal light and the reference light can be sufficiently overlapped with each other on the hologram recording medium. Consequently, a good picture quality of recording data can be maintained. Thus, with the inline type speckle multiplexed hologram recording apparatus, since light emitted from part of the spatial light modulator which spatially modulates coherent light to produce signal light is used as reference light, the signal light and the reference light can be condensed in a sufficiently overlapping relationship with each other on the hologram recording medium without using a lens which has a great aperture and a great angle of view. Furthermore, since the signal light and the reference light are generated from the same spatial light modulator, the accuracy in position of different optical parts can be maintained readily, and the reproducibility of recording and reproduction operations and the compatibility with a different apparatus can be enhanced.

Preferably, the inline type speckle multiplexed hologram recording apparatus further comprises a diffusion member for diffusing both of the signal light and the reference light produced or only the reference light. Where the reference light is diffused by the diffusion member to form reference light of a speckle shape and the signal light is diffused so that the intensity distribution thereof on a Fourier plane may be uniform, speckle multiplexing recording can be performed without deteriorating the characteristic of the hologram recording medium. Consequently, the multiplicity loss by which the angle between the signal light and the reference light according to the inline system decreases can be compensated for to enhance the recording density.

Preferably, the display control section displays a pattern in the reference light region of the spatial light modulator and varies the pattern to vary a speckle pattern of the reference light to record data in a multiplexed state. Where a pattern is displayed in the reference light region and varied, the speckle pattern of the reference light can be varied thereby to record data in a multiplexed state in the same recording region of the hologram recording medium.

According to another embodiment of the present invention, there is provided a hologram recording method wherein signal light and reference light are produced from coherent light and illuminated from the same direction on a hologram recording medium to record interference fringes of the signal light and the reference light in the hologram recording medium, wherein light emitted from a portion of a spatial light modulator which spatially modulates the coherent light to produce the signal light is used as the reference light.

With the hologram recording method, since the signal light and the reference light are generated from the same spatial light modulator, the accuracy in position among different optical parts can be maintained readily, and the reproducibility of recording and reproduction operations and the compatibility with a different apparatus can be enhanced.

According to a further embodiment of the present invention, there is provided an inline type speckle multiplexed hologram method, comprising the steps of displaying a signal light region and a reference light region on a spatial light modulator, intensity modulating coherent light with recording data displayed in the signal light region and diffusing the intensity modulated light by means of a diffusion member to produce signal light, diffusing the light passing through the reference light region by means of the diffusion member to produce reference light, and recording interference fringes produced by condensing the diffused signal light and the diffused reference light in an overlapping relationship with each other on a hologram recording medium into the hologram recording medium.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

Embodiment 1

Figure 1:
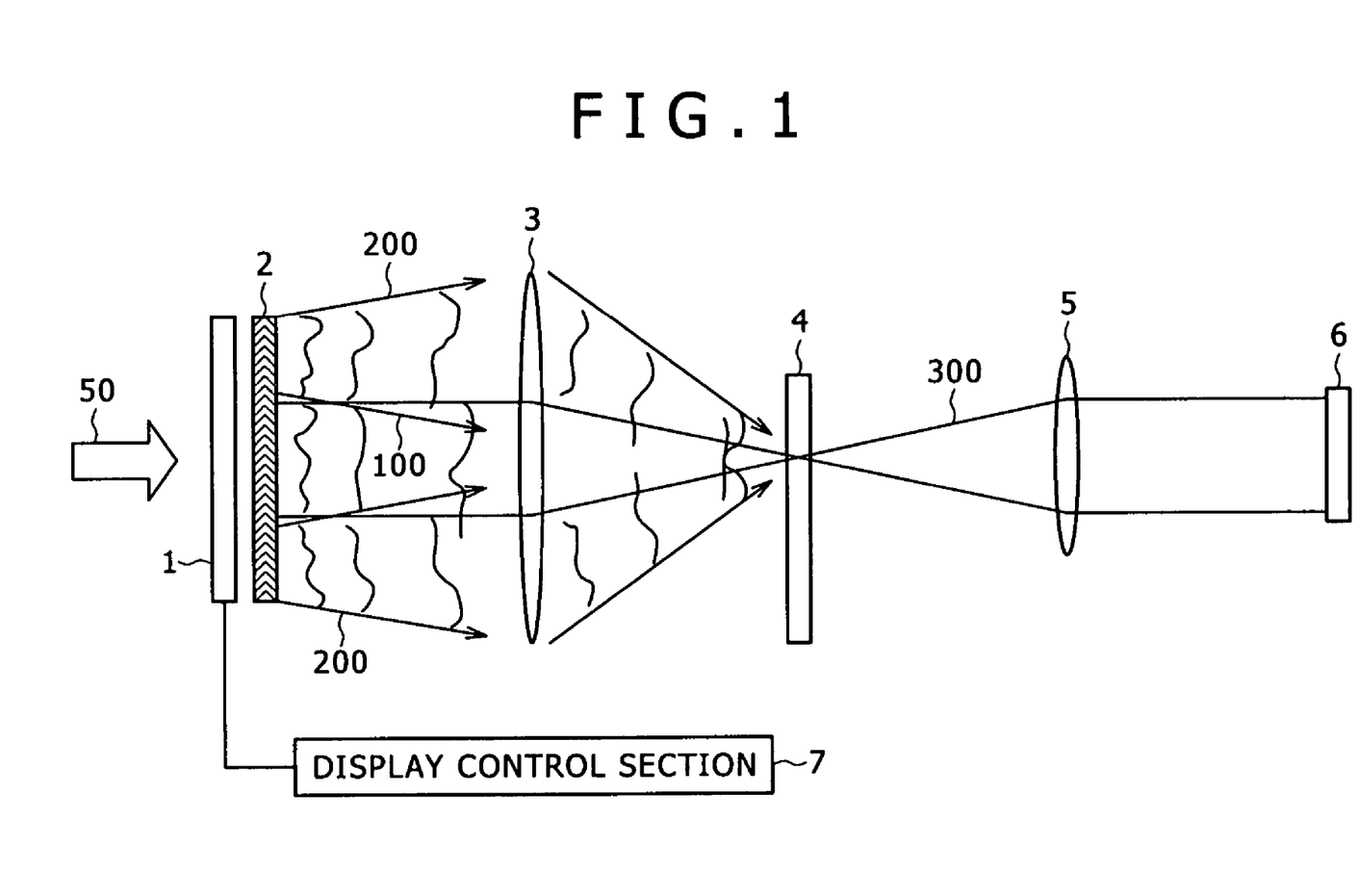
FIG. 1 is a schematic view showing a configuration of an inline type speckle multiplexing hologram recording and reproducing apparatus according to a first embodiment of the present invention.

Referring to FIG. 1, there is shown a configuration of an inline type speckle multiplexed hologram recording and reproducing apparatus according a first embodiment of the present invention. The inline type hologram recording apparatus shown includes a spatial light modulator (SLM) 1 for intensity modulating laser light, and a diffuser (diffusion member) 2 disposed in the proximity of the spatial light modulator 1 and having phase differences of 0 and $\pi$. The inline type hologram recording apparatus further includes a lens 3 for condensing signal light 100 and reference light 200 on a hologram recording medium 4 so that a hologram is recorded in the hologram recording medium 4. The inline type hologram recording apparatus further includes a lens 5 for condensing diffraction light produced from the hologram recording medium 4 to form an image on an image sensor 6. The image sensor 6 photoelectrically converts the image formed thereon to produce a reproduction signal. The inline type hologram recording apparatus further includes a display control section 7 for displaying various images (including also recording data) on the spatial light modulator 1.

Figure 2:
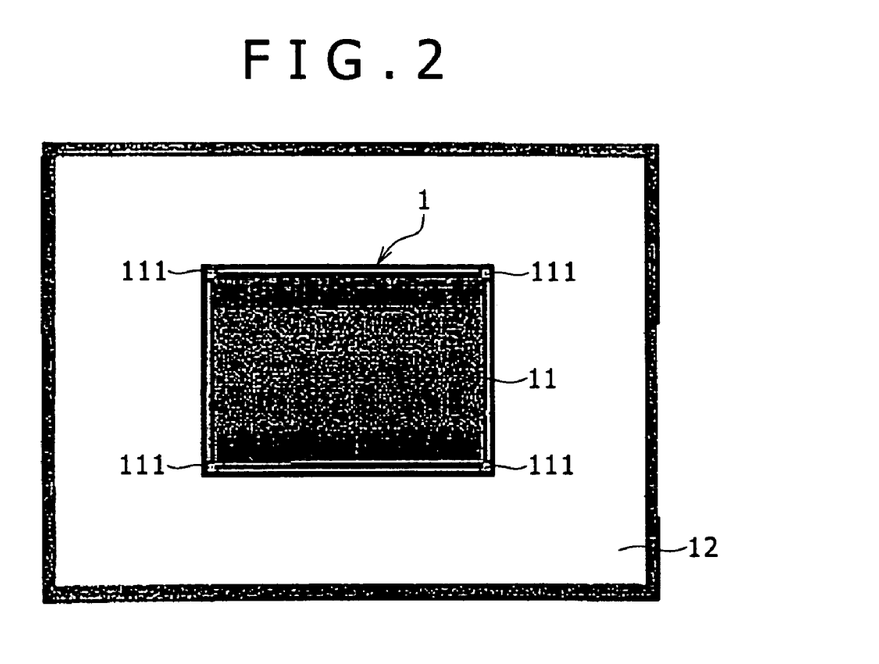
FIG. 2 is a schematic view showing an example of an image displayed on a spatial light modulator shown in FIG. 1 upon recording.

FIG. 2 shows an example of an image displayed on the spatial light modulator 1 under the control of the display control section 7. A signal light region 11 for displaying a data page is provided at a central position of the spatial light modulator 1, and a reference light region 12 is provided around the signal light region 11 and is displayed in white. Not only a data pattern but also four alignment marks 111 used for positioning when an image is to be cut off upon reproduction are displayed in the signal light region 11.

Next, operation of the inline type hologram recording apparatus of the present embodiment is described. In the hologram recording apparatus of the present embodiment, an inline method is applied wherein signal light 100 and reference light 200 are introduced into the hologram recording medium 4 from the same direction. In this instance, in order to eliminate a characteristic that the Bragg selectivity decreases to reduce the recording density, a method is applied wherein recording and reproduction of data are performed using a speckle multiplexing method.

Upon recording, laser light 50 emitted from a laser light source not shown and converted into parallel light is introduced into the spatial light modulator 1 and intensity modulated by the spatial light modulator 1 based on a data page displayed in the signal light region 11 to form signal light 100. On the other hand, the laser light 50 introduced in the reference light region 12 passes as it is through the reference light region 12 to make reference light 200. The signal light 100 and the reference light 200 are individually diffused by the diffuser 2 and condensed on the hologram recording medium 4 by the lens 3. Consequently, interference fringes produced by interference between the signal light 100 and reference light 200 are recorded in the hologram recording medium 4.

When the reference light 200 is diffused by the diffuser 2, the reference light 200 obtains a speckle shape, and the reference light having the speckle pattern is condensed on the hologram recording medium 4. Therefore, when the speckle pattern and the signal light 100 interfere with each other, the Bragg selectivity can be increased and data can be multiplexed and recorded with a shift amount of a distance corresponding to the speckle size. Consequently, a high recording density can be implemented.

On the other hand, when the signal light 100 in the intensity modulated state is diffused by the diffuser 2, the intensity distribution of the signal light 100 on the face (Fourier face) of the hologram recording medium 4 is uniformed. As a result, the photosensitivity of the recording region of the hologram recording medium 4 is uniformed, and the recording characteristic is improved significantly.

Figure 3:
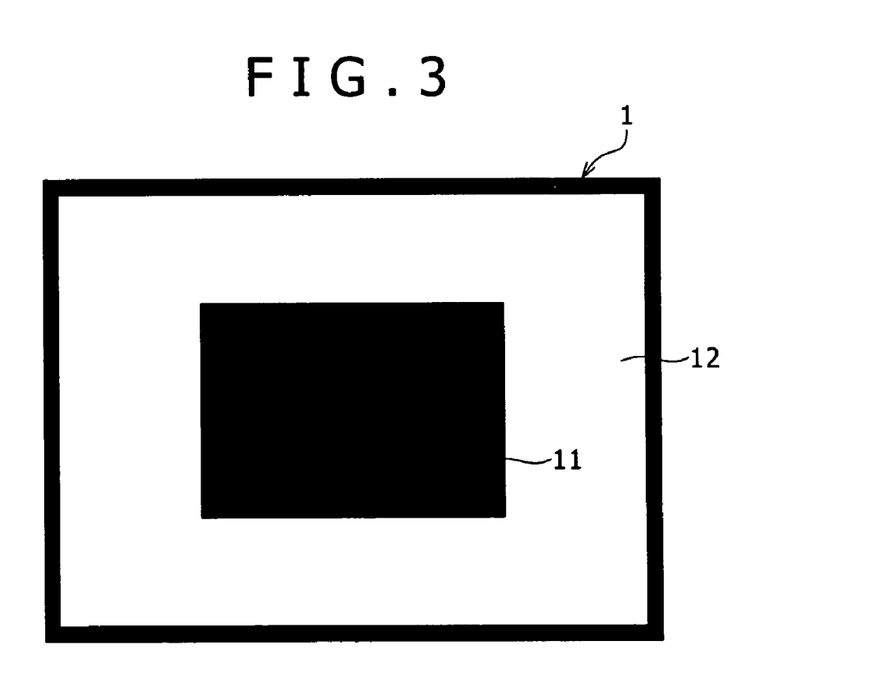
FIG. 3 is a schematic view showing an example of an image displayed on the spatial light modulator shown in FIG. 1 upon reproducing.

Upon reproduction, such an image as shown in FIG. 3 is displayed on the spatial light modulator 1 under the control of the display control section 7. In particular, the reference light region 12 remains displaying white, but the signal light region 11 now displays black. Therefore, the signal light cannot pass through the signal light region 11. Consequently, the laser light 50 passes only through the reference light region 12 to make reference light (illumination reference light) 200. The reference light 200 is diffused by the diffuser 2 and illuminated on the recording region of the hologram recording medium 4 by the lens 3. Consequently, diffraction light 300 corresponding to the recorded interference fringes is produced. The diffraction light 300 is condensed by the lens 5 to form an image on the image sensor 6, and a photoelectric conversion signal is obtained and processed by the image sensor 6 to produce reproduction image data.

Figure 4:
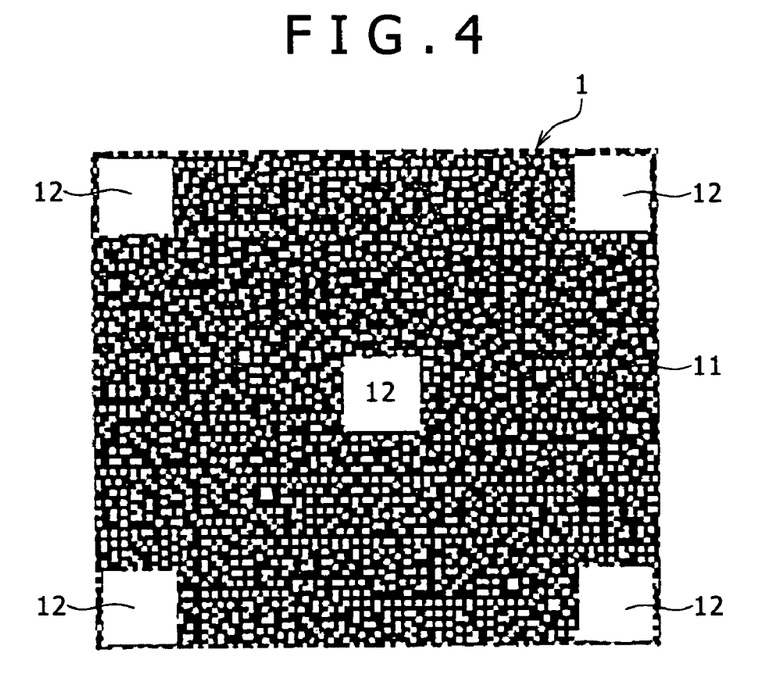
FIG. 4 is a schematic view showing an example of another image displayed on the spatial light modulator shown in FIG. 1 upon recording.

Incidentally, the image to be displayed on the spatial light modulator 1 under the control the display control section 7 is not limited to the example shown in FIG. 2, but an image may be displayed otherwise as shown in FIG. 4 wherein a plurality of reference light regions 12 are displayed divisionally in a distributed fashion on the displaying face of the spatial light modulator 1. Also in this instance, signal light 100 intensity modulated based on the data pattern displayed on the signal light region 11 is produced, and laser light passing through the reference light regions 12 makes reference light 200. Also by such an image displaying process as just described, a recording operation similar to that described above is performed.

However, since the image described hereinabove with reference to FIG. 3 described above includes no alignment mark, upon decoding, actually the position of a reproduction image and the position of the image sensor 6 are adjusted so as to overlap with each other to detect the origin of image information using another method. Accordingly, when the example just described is carried out, decoding of a hologram is performed utilizing, for example, the position of an alignment mark of another hologram.

With the inline type hologram recording apparatus of the present embodiment, the displaying face of the spatial light modulator 1 is divisionally used for the signal light region 11 and the reference light region 12. Then, signal light 100 is produced utilizing the signal light region 11 while reference light 200 is produced utilizing the reference light region 12. The signal light 100 and the reference light 200 are condensed on the hologram recording medium 4 by the lens 3. Consequently, the aperture size of the lens 3 can be reduced, and the angle of view of the lens 3 may not be made very wide. Further, designing of the lens 3 is simplified, and fabrication of a hologram recording apparatus which applies the speckle multiplexing method using the inline method can be easily implemented.

Further, since the spatial light modulator 1 has the reference light region 12 for producing the reference light 200, the reproducibility of the optical system can be enhanced significantly. In order to achieve enhancement of the reproducibility, it is necessary to configure the speckle multiplexing method such that the positional accuracy between a reference light phase diffusion plate and a spatial light modulator or a signal light phase diffusion plate is high. In this instance, in the optical system wherein the reference light phase diffusion plate, spatial light modulator and signal light phase diffusion plate are formed independently of each other, it is difficult to obtain stabilized reproducibility. However, if part of the spatial light modulator 1 is used for the reference light reproducing section as in the present embodiment, then the number of members for which the high positional accuracy is required can be decreased.

Furthermore, if a random or particular pattern is displayed in the reference light region 12 of the spatial light modulator 1 and then the displayed pattern is changed, then the speckle pattern of the reference light 200 passing the diffuser 2 can be changed. Consequently, multiplexing recording by speckle multiplexing can be performed in the same recording region of the hologram recording medium 4. Besides, if a normal speckle multiplexing method which is based on a shift is used simultaneously, then the recording density can be further enhanced.

Incidentally, with the inline type hologram recording apparatus of the embodiment described above, since the reference light region 12 is provided on the spatial light modulator 1, the area of the signal light region 11 for displaying data decreases as much and the recording capacity cannot be increased as much. This problem is solved by an inline type hologram recording apparatus according to a second embodiment of the present invention described below.

Embodiment 2

Figure 5:
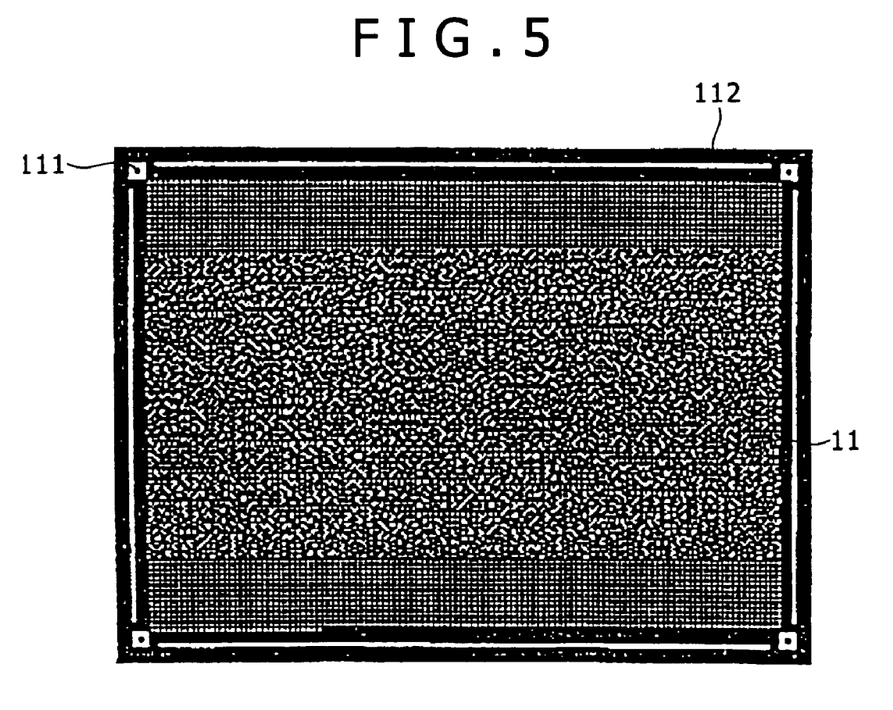
FIG. 5 is a schematic view showing a configuration of part of an inline type speckle multiplexing hologram recording and reproducing apparatus according to a second embodiment of the present invention.

FIG. 5 shows a configuration of part of the inline type speckle multiplexing hologram recording and reproduction apparatus according to the second embodiment of the present invention. The inline type speckle multiplexing hologram recording and reproduction apparatus according to the second embodiment is a modification to that according to the first embodiment. Thus, only differences of the inline type speckle multiplexing hologram recording and reproduction apparatus of the second embodiment from that of the first embodiment are described below.

The inline type speckle multiplexing hologram recording and reproduction apparatus according to the present embodiment uses alignment marks 111, which are used on the spatial light modulator 1 together with a data pattern, as production portions for reference light 200. Therefore, such an image as shown in FIG. 5 is displayed over a full area of the displaying section of the spatial light modulator 1. The image shown includes four alignment marks 111 at the four corners and straight lines 112 which interconnect adjacent ones of the alignment marks 111. The inline type speckle multiplexing hologram recording and reproduction apparatus according to the present embodiment utilizes the four alignment marks 111 and the four straight lines 112 as reference light production portions.

When laser light 50 passes through the signal light region 11, it is intensity modulated with a data pattern to form signal light 100. On the other hand, when the laser light 50 passes through the four alignment marks 111 and the four straight lines 112, reference light 200 is formed from the laser light 50. The signal light 100 and the reference light 200 are diffused by the diffuser 2 and then condensed on the hologram recording medium 4 by the lens 3, and interference fringes of the signal light 100 and the reference light 200 are recorded.

In this instance, attention must be paid to the problem of the intensity ratio between the signal light 100 and the reference light 200. When a hologram is to be recorded, the optimum intensity ratio between the signal light 100 and the reference light 200 depends upon the recording material, optical system and system parameters. For example, where the optimum intensity ratio is ideally 1:1, in order to achieve the intensity ratio of 1:1 with such an image pattern as shown in FIG. 5, it is necessary to make the light transmittances (or reflection factors) of the region (=reference light section) of the alignment marks 111 and the straight lines 112 of the spatial light modulator 1 and the signal light region (signal light section) 11 different from each other. Or, it is necessary for the light, which is to be introduced into the spatial light modulator 1, to have a distribution in intensity.

Figure 6:
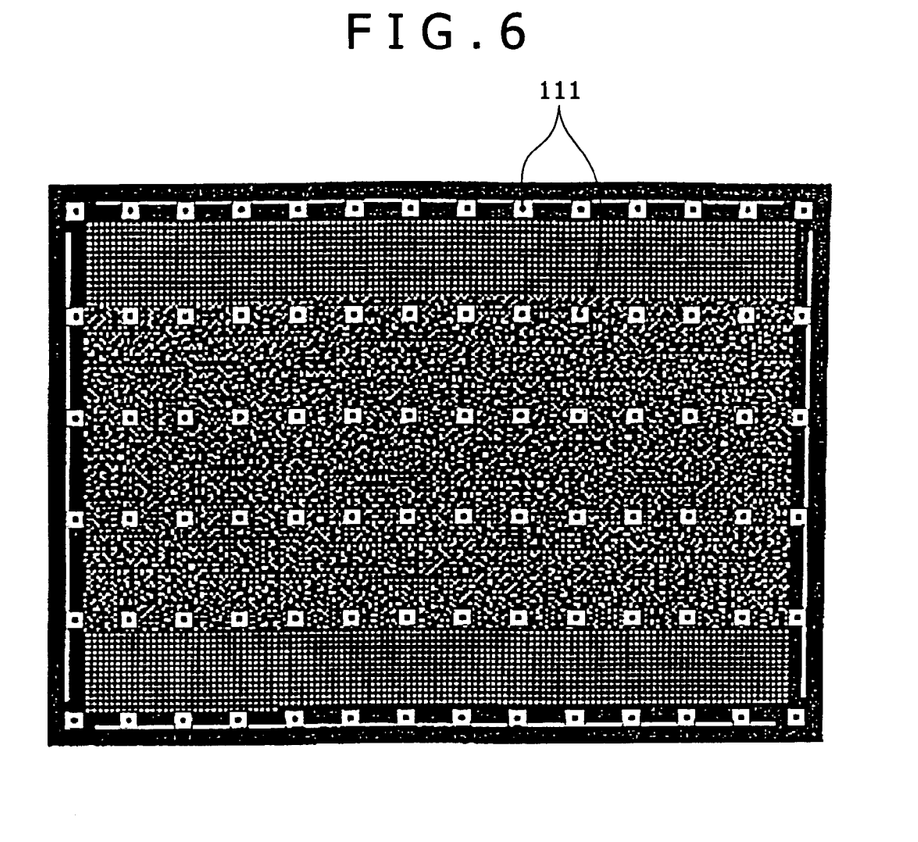
FIG. 6 is a schematic view showing an example of an image displayed on a spatial light modulator of the second embodiment upon recording.

As a different method, a greater number of alignment marks 111 may be disposed as seen in FIG. 6 so that the intensity ratio between the signal light 100 and the reference light 200 may be 1:1. Where the alignment marks 111 are disposed in a distributed fashion also in the inside of the signal light region 11 as seen in FIG. 6, it is possible to optimize the intensity ratio between the signal light 100 and the reference light 200 (usually, the optimum value of the intensity radio is a value proximate to 1:1).

Figure 7:
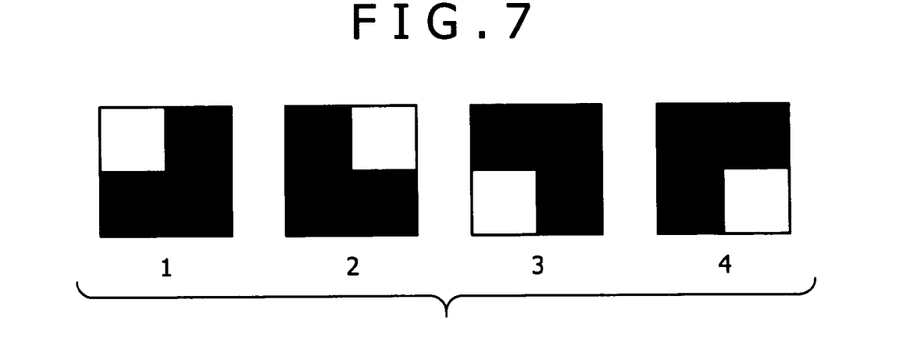
FIG. 7 is a schematic view illustrating a manner of modulation of signal light and a relationship in intensity ratio between reference light and signal light upon the modulation.

In the following, the area occupied by the alignment marks in this instance is described. In order to calculate the area, it is necessary to describe modulation of the signal light 100. A method called 2_4 modulation is described here. According to the modulation methods, 4 bits are used represent 2 bits. For example, pixels which are to pass light therethrough and numerical values to be represented are made correspond to each other as seen in FIG. 7. In the example illustrated in FIG. 7, normally one of the four pixels is in a lit state (a state in which light passes). From this, it can be recognized that, if one fifth the overall area is used as alignment marks (=reference light sections) while the remaining four fifths are used as signal light portions, then the intensity ratio of signal light and reference light from within all light passing through the spatial light modulator 1 becomes 1:1.

While a great number of signal modulation methods are applicable, an advantageous method for hologram storage is a modulation method called constant-weight code. The constant-weight code is a general term of modulation methods wherein the numbers of on pixels and off pixels in one code block are determined. This modulation can be used advantageously for a hologram because the light intensity ratio between signal light and reference light is fixed.

Even if the 2_4 modulation is not used, the constant-weight code can be configured readily. For example, a code wherein one code block includes nine pixels and the number of on pixels among the nine pixels is 3 apparently is a constant-weight code. If this code is used, then information of $_9C_3=84$ bits can be represented by one code block.

With the inline type speckle multiplexing hologram recording and reproduction apparatus according to the present embodiment, the alignment marks 111 and the straight lines 112 displayed on the spatial light modulator 1 are utilized effectively as a reference light production section. Consequently, a wide area can be assured for the signal light region 11 of the spatial light modulator 1, and decrease of the storage capacity for data can be suppressed as much.

Further, where a large number of alignment marks 111 are distributed on the spatial light modulator 1, the signal light 100 and the reference light 200 interfere readily with each other in the hologram recording medium 4, and holograms of a good picture quality can be obtained. Further, where a great number of distributed alignment marks are utilized, distortion caused by the lens 3 can be corrected.

Embodiment 3

Figure 8:
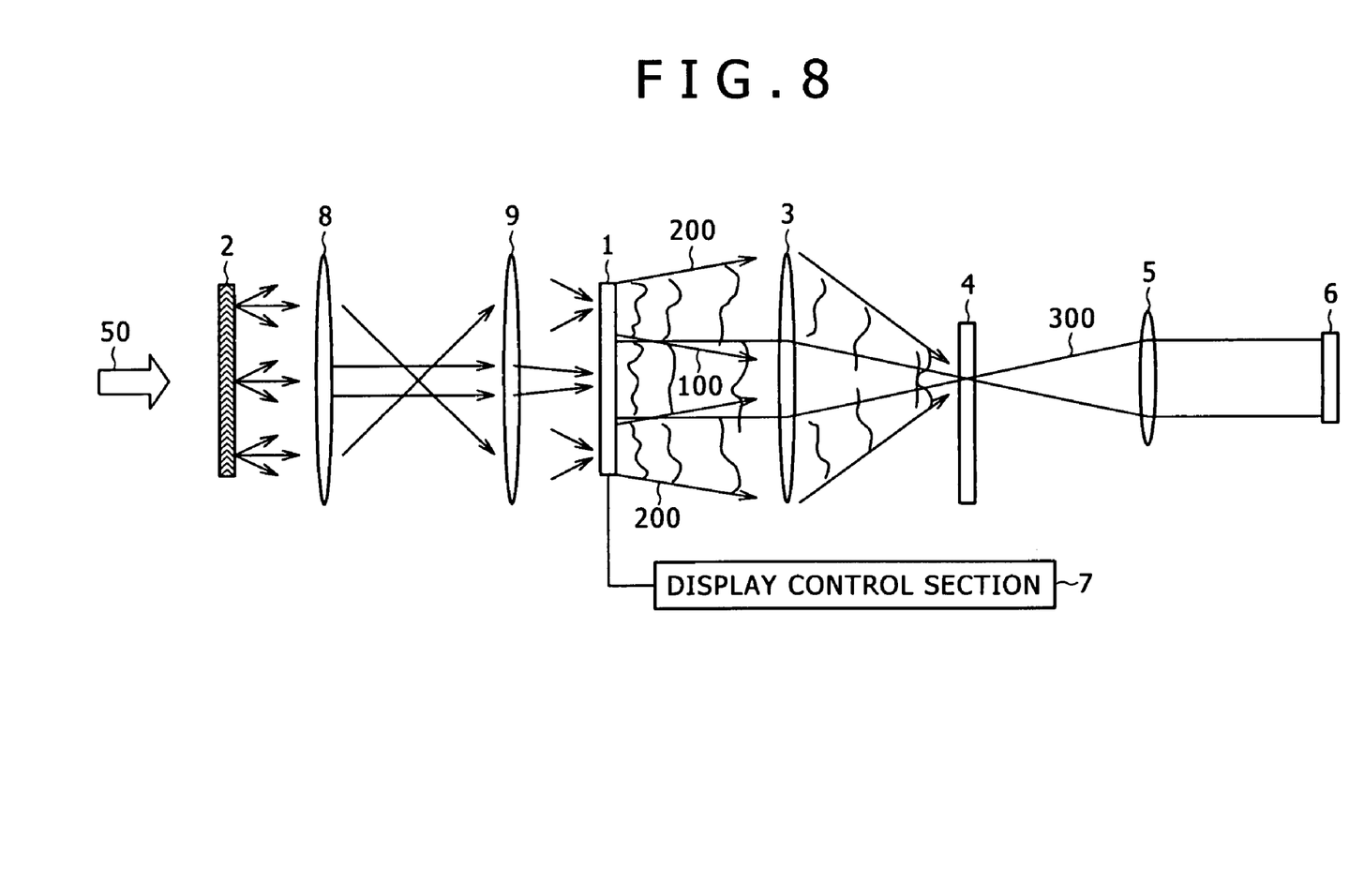
FIG. 8 is a schematic view showing a configuration of an inline type speckle multiplexing hologram recording and reproducing apparatus according to a third embodiment of the present invention.

FIG. 8 shows a configuration of an inline type speckle multiplexing hologram recording and reproduction apparatus according to a third embodiment of the present invention. The inline type speckle multiplexing hologram recording and reproduction apparatus according to the third embodiment is a modification to that according to the first embodiment. Thus, only differences of the inline type speckle multiplexing hologram recording and reproduction apparatus of the third embodiment from that of the first embodiment are described below.

The inline type speckle multiplexing hologram recording and reproduction apparatus projects the diffuser 2 on the spatial light modulator 1 through the lenses 8 and 9. Even with the configuration just described, the diffuser 2 operates similarly as in the case wherein it is disposed closely to the spatial light modulator 1. Thus, reference light 200 diffused by the diffuser 2 and signal light 100 diffused by the diffuser 2 are produced by the spatial light modulator 1 and advance toward the lens 3. Except this, the inline type speckle multiplexing hologram recording and reproduction apparatus of the present embodiment operates similarly to and exhibits similar effects to those of the inline type speckle multiplexing hologram recording and reproduction apparatus of the first embodiment described hereinabove.

It is to be noted that the present invention is not limited to the embodiments described above, but can be carried out in various forms in terms of the configuration, function, action and effect without departing from the spirit and scope thereof. For example, while, in the embodiments described above, a diffuser having a random pattern wherein the phase differences are 0 and π is used as the diffuser, the diffuser is not limited to this but may be a ground glass plate or the like only if signal light and reference light can be diffused thereby. Further, even if the diffuser is configured otherwise such that it diffuses only reference light, a hologram can be recorded on a hologram recording medium. Or, even if the degrees (manners) of diffusing signal light and reference light are made different from each other such that, for example, the signal light is diffused weakly whereas the reference light is diffused strongly, a hologram can be recorded on a hologram recording medium, and similar effects can be anticipated.

What is claimed is:

1. An inline type speckle multiplexed hologram recording apparatus which produces signal light and reference light from coherent light and illuminates the signal light and the reference light from the same direction on a hologram recording medium to record interference fringes of the signal light and the reference light in the hologram recording medium, comprising:
    a spatial light modulator configured to spatially modulate the coherent light;
    a display control section configured to display a reference light region used to produce the reference light from the coherent light introduced into said spatial light modulator and a signal light region used to produce the signal light intensity modulated with data at the same time on said spatial light modulator; and
    a diffusion member configured to diffuse both the signal light and the reference light output from the spatial light modulator.

2. An inline type speckle multiplexed hologram recording apparatus according to claim 1, wherein said diffusion member diffuses the signal light and the reference light with different degrees of diffusion from each other.

3. An inline type speckle multiplexed hologram recording apparatus according to claim 1, wherein said diffusion member is disposed closely in front of or in the rear of said spatial light modulator.

4. An inline type speckle multiplexed hologram recording apparatus according to claim 1, wherein said diffusion member is projected on said spatial light modulator.

5. An inline type speckle multiplexed hologram recording apparatus according to claim 1, wherein said display control section is configured to display a plurality of reference light regions in a distributed relationship in said signal light region.

6. An inline type speckle multiplexed hologram recording apparatus according to claim 1, wherein said reference light region is configured to position reproduction data to be displayed on said spatial light modulator.

7. An inline type speckle multiplexed hologram recording apparatus according to claim 6, wherein a plurality of such display sections for positioning are displayed around and/or inside said signal light region.

8. An inline type speckle multiplexed hologram recording apparatus according to claim 1, wherein the hologram recording medium is configured to be displaced by a small distance to record data in a multiplexed state.

9. An inline type speckle multiplexed hologram recording apparatus according to claim 1, wherein said display control section displays a pattern in said reference light region of said spatial light modulator and varies the pattern to vary a speckle pattern of the reference light to record data in a multiplexed state.

10. An inline type speckle multiplexed hologram recording apparatus according to claim 1, wherein said display control section displays said signal light region and said reference light region with luminance values of different from each other on said spatial light modulator.

11. An inline type speckle multiplexed hologram recording apparatus according to claim 10, wherein said display control section controls said spatial light modulator such that pixels which pass light therethrough in said signal light region and pixels which pass light therethrough in said reference light region are different from each other.

12. A hologram recording method wherein signal light and reference light are produced from coherent light and illuminated from the same direction on a hologram recording medium to record interference fringes of the signal light and the reference light in the hologram recording medium, comprising:
    emitting light from a portion of a spatial light modulator which spatially modulates the coherent light to produce the signal light and the reference light; and
    diffusing both the signal light and the reference light output from the spatial light modulator.

13. A hologram recording method according to claim 12, wherein light emitted from a plurality of positioning marks upon reproduction of the spatial light modulator is used as the reference light, and the positioning marks are distributed on a displaying face of the spatial light modulator such that the signal light and the reference light sufficiently overlap with each other in the hologram recording medium.

* * * * *